United States Patent
Yaras et al.

(10) Patent No.: US 11,086,128 B2
(45) Date of Patent: Aug. 10, 2021

(54) METHODS AND APPARATUSES FOR REDUCING STRAY LIGHT EMISSION FROM AN EYEPIECE OF AN OPTICAL IMAGING SYSTEM

(71) Applicant: Magic Leap, Inc., Plantation, FL (US)

(72) Inventors: Fahri Yaras, Cedar Park, TX (US); Eric C. Browy, Coral Springs, FL (US); Victor Kai Liu, Mountain View, CA (US); Samarth Bhargava, Palo Alto, CA (US); Vikramjit Singh, Pflugerville, TX (US); Michal Beau Dennison Vaughn, Round Rock, TX (US); Joseph Christopher Sawicki, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 427 days.

(21) Appl. No.: 16/144,656

(22) Filed: Sep. 27, 2018

(65) Prior Publication Data
US 2019/0094551 A1   Mar. 28, 2019

Related U.S. Application Data

(60) Provisional application No. 62/564,528, filed on Sep. 28, 2017.

(51) Int. Cl.
*G02B 27/42* (2006.01)
*G02B 27/01* (2006.01)
(Continued)

(52) U.S. Cl.
CPC ..... *G02B 27/0172* (2013.01); *G02B 6/29328* (2013.01); *G02B 6/34* (2013.01);
(Continued)

(58) Field of Classification Search
CPC ........ G02B 27/01; G02B 27/22; G02B 27/42; G02B 6/35; G02B 27/0172;
(Continued)

(56) References Cited

U.S. PATENT DOCUMENTS 7,758,185 B2   7/2010   Lewis
8,189,263 B1 *  5/2012   Wang ................. G02B 27/0172
                                                          359/633
(Continued)

FOREIGN PATENT DOCUMENTS

WO   WO2013188464 A2   12/2013
WO   WO2017131983 A1    8/2017

OTHER PUBLICATIONS

International Search Report and Written Opinion for Int'l Application No. PCT/US2018/053172, 19 pages.
(Continued)

*Primary Examiner* — Balram T Parbadia
(74) *Attorney, Agent, or Firm* — Fish & Richardson P.C.

(57) ABSTRACT

An eyepiece for a head-mounted display includes one or more first waveguides arranged to receive light from a spatial light modulator at a first edge, guide at least some of the received light to a second edge opposite the first edge, and extract at least some of the light through a face of the one or more first waveguides between the first and second edges. The eyepiece also includes a second waveguide positioned to receive light exiting the one or more first waveguides at the second edge and guide the received light to one or more light absorbers.

20 Claims, 12 Drawing Sheets

(51) Int. Cl.
*G02B 6/35* (2006.01)
*G02B 6/34* (2006.01)
*G02B 6/293* (2006.01)
*G02B 30/50* (2020.01)
*G02B 6/12* (2006.01)

(52) U.S. Cl.
CPC .......... *G02B 6/3534* (2013.01); *G02B 27/42* (2013.01); *G02B 30/50* (2020.01); *G02B 2006/12107* (2013.01); *G02B 2027/012* (2013.01)

(58) Field of Classification Search
CPC .... G02B 27/4272; G02B 30/50; G02B 5/003; G02B 6/29328; G02B 6/34; G02B 6/3534; G02B 2006/12107; G02B 26/00; G02B 26/08; G02B 27/00; G02B 5/00; G02B 6/26; G02B 6/293; G02B 2027/012; F21V 8/00
See application file for complete search history.

(56) References Cited

U.S. PATENT DOCUMENTS

| | | | |
|---|---|---|---|
| 8,353,594 B2 | 1/2013 | Lewis | |
| 8,696,113 B2 | 4/2014 | Lewis | |
| 8,733,927 B1 | 5/2014 | Lewis | |
| 8,733,928 B1 | 5/2014 | Lewis | |
| 9,010,929 B2 | 4/2015 | Lewis | |
| 9,235,064 B2 | 1/2016 | Lewis | |
| 9,239,473 B2 | 1/2016 | Lewis | |
| 9,244,293 B2 | 1/2016 | Lewis | |
| 9,310,559 B2 | 4/2016 | Macnamara | |
| 9,658,473 B2 | 5/2017 | Lewis | |
| 9,671,566 B2 | 6/2017 | Abovitz et al. | |
| 10,151,937 B2 | 12/2018 | Lewis | |
| 10,185,147 B2 | 1/2019 | Lewis | |
| 2010/0277803 A1* | 11/2010 | Pockett | G02B 27/0081 359/567 |
| 2013/0163089 A1 | 6/2013 | Bohn | |
| 2013/0314793 A1 | 11/2013 | Robbins | |
| 2014/0168260 A1* | 6/2014 | O'Brien | G02B 27/0172 345/633 |
| 2015/0309263 A2 | 10/2015 | Abovitz et al. | |
| 2016/0341575 A1 | 11/2016 | Kaehler | |
| 2017/0255016 A1 | 9/2017 | Tinch | |

OTHER PUBLICATIONS

Azuma, "A Survey of Augmented Reality," Presence: Teleoperators and Virtual Environments, Aug. 1997, 6(4):355-385.
Azuma, "Predictive tracking for augmented reality." Dissertation for the degree of Doctor of Philosophy, University of North Carolina at Chapel Hill, Department of Computer Science, Feb. 1995, 262 pages.
Bimber et al., "Spatial Augmented Reality Merging Real and Virtual Worlds," A K Peters, Ltd. (ed.), 2005, 393 pages.
EP Extended European Search Report in EP Appln. No. 18863754.0, dated Oct. 27, 2020, 10 pages.
hitl.washington.edu [online], "Hardware," available on or before Oct. 13, 2005, via Internet Archive: Wayback Machine URL <https://web.archive.org/web/20051013062315/http://www.hitl.washington.edu:80/artoolkit/documentation/hardware.htm>, retrieved on Mar. 3, 2021, URL <http://www.hitl.washington.edu/artoolkit/documentation/hardware.htm>, 3 pages.
Jacob, "Eye Tracking in Advanced Interface Design," Virtual environments and advanced interface design, 1995, 258:288, 50 pages.
Tanriverdi et al., "Interacting with Eye Movements in Virtual Environments," Proc. of the SIGCHI Conference on Human Factors in Computing Systems, 2000, pp. 265-272.

* cited by examiner

METHODS AND APPARATUSES FOR REDUCING STRAY LIGHT EMISSION FROM AN EYEPIECE OF AN OPTICAL IMAGING SYSTEM

CROSS-REFERENCE TO RELATED APPLICATION

This application claims the benefit of the filing date of U.S. Provisional Application No. 62/564,528, filed on Sep. 28, 2017. The contents of U.S. Application No. 62/564,528 are incorporated herein by reference in their entirety.

TECHNICAL FIELD

This disclosure relates to components for reducing stray light emission in optical imaging systems.

BACKGROUND

Imaging systems can be used to present visual information to a user. For example, an imaging system can include an optical component that projects images onto an imaging surface, such that one or more users can view the image. In some cases, imaging systems can be incorporated into a head-mounted display device to present visual information in a more immersive manner. For example, head-mounted displays can be used to present visual information for virtual reality (VR) or augmented reality (AR) systems.

SUMMARY

In an aspect, an eyepiece for a head-mounted display includes one or more first waveguides arranged to receive light from a spatial light modulator at a first edge, guide at least some of the received light to a second edge opposite the first edge, and extract at least some of the light through a face of the one or more first waveguides between the first and second edges. The eyepiece also includes a second waveguide positioned to receive light exiting the one or more first waveguides at the second edge and guide the received light to one or more light absorbers.

Implementations of this aspect can include one or more of the following features.

In some implementations, the eyepiece can further include optical structures arranged between the second edge of the one or more first waveguides and configured to couple light from the one or more first waveguides into the second waveguide.

In some implementations, the eyepiece can further include a reflector. The second waveguide can be arranged between the reflector and the one or more first waveguides. The reflector can be configured to reflect light that enters the second waveguide from the one or more first waveguides so that the light is guided to the one or more light absorbers.

In some implementations, the one or more absorbers can be located out of a field of view of a user during operation of the head-mounted display by the user.

In some implementations, the eyepiece can further include one or more additional waveguides positioned to receive light exiting the one or more first waveguides at one or more additional edges of the one or more first waveguides, and guide the received light from the one or more additional edges to one or more additional light absorbers.

In some implementations, the one or more first waveguides can be located in a field of view of a user during operation of the head-mounted display by the user.

In some implementations, the one or more first waveguides can include one or more diffractive optical elements extending between the first edge and the second edge. The one or more diffractive optical elements can be configured to extract at least some of the light through a face of the one or more first waveguides between the first and second edge.

In some implementations, at least one of the one or more diffractive optical elements can be disposed within an interior of the one or more first waveguides.

In some implementations, at least one of the one or more diffractive optical elements can be disposed along a periphery of the one or more first waveguides.

In some implementations, the eyepiece can further include a third waveguide arranged to receive light from the spatial light modulator at a third edge, guide at least some of the received light to a fourth edge opposite the third edge, extract at least some of the light through a face of the third waveguide between the third and fourth edges. The eyepiece can further include a fourth waveguide positioned to receive light exiting the third waveguide at the fourth edge and guide the received light to one or more second light absorbers.

In some implementations, the second waveguide can be define a grating pattern along its periphery.

In some implementations, the second waveguide can be integral with the one or more first waveguides.

In some implementations, the grating pattern can be defined on at least one of a first face of the second waveguide or second face of the second waveguide. The first face of the second waveguide can be opposite to the second face of the second waveguide.

In some implementations, the second waveguide can be distinct from the one or more first waveguides.

In some implementations, the eyepiece can further include a light absorbing material deposited along the grating pattern.

In some implementations, the grating pattern can be defined along an entirely of the periphery of the second waveguide.

In some implementations, the light absorbing material can be deposited along an entirely of the periphery of the second waveguide.

In some implementations, the grating pattern can be defined along a subset of the periphery of the second waveguide.

In some implementations, the light absorbing material can be deposited along a subset of the periphery of the second waveguide.

In some implementations, the eyepiece can include an optical coupler subsystem configured to receive the light from the spatial light modulator and direct the light in a first direction towards the first edge of the one or more first waveguides along a primary emission axis.

In some implementations, the second waveguide can include a peripheral edge in a second direction from the optical coupler subsystem. The second direction can be opposite from the first direction. The peripheral edge can be inclined with respect to the primary emission axis.

The implementations described herein can provide various benefits. In some cases, the features described herein can reduce the amount of stray light escaping from an optical system (e.g., an eyepiece and/or a head-mounted display). Accordingly, the optical system can present higher quality digital imagery to a user than a comparable system in which experiences more stray light. In some cases, the features described herein can increase the resolution of the projected digital imagery, increase the contrast of the digital imagery, reduce the presence of undesired image artifacts, and/or facilitate accurate reproduction of color.

The details of one or more embodiments are set forth in the accompanying drawings and the description below. Other features and advantages will be apparent from the description and drawings, and from the claims.

DESCRIPTION OF DRAWINGS

Like numerals in different figures indicate like elements.

DETAILED DESCRIPTION

Figure 1:
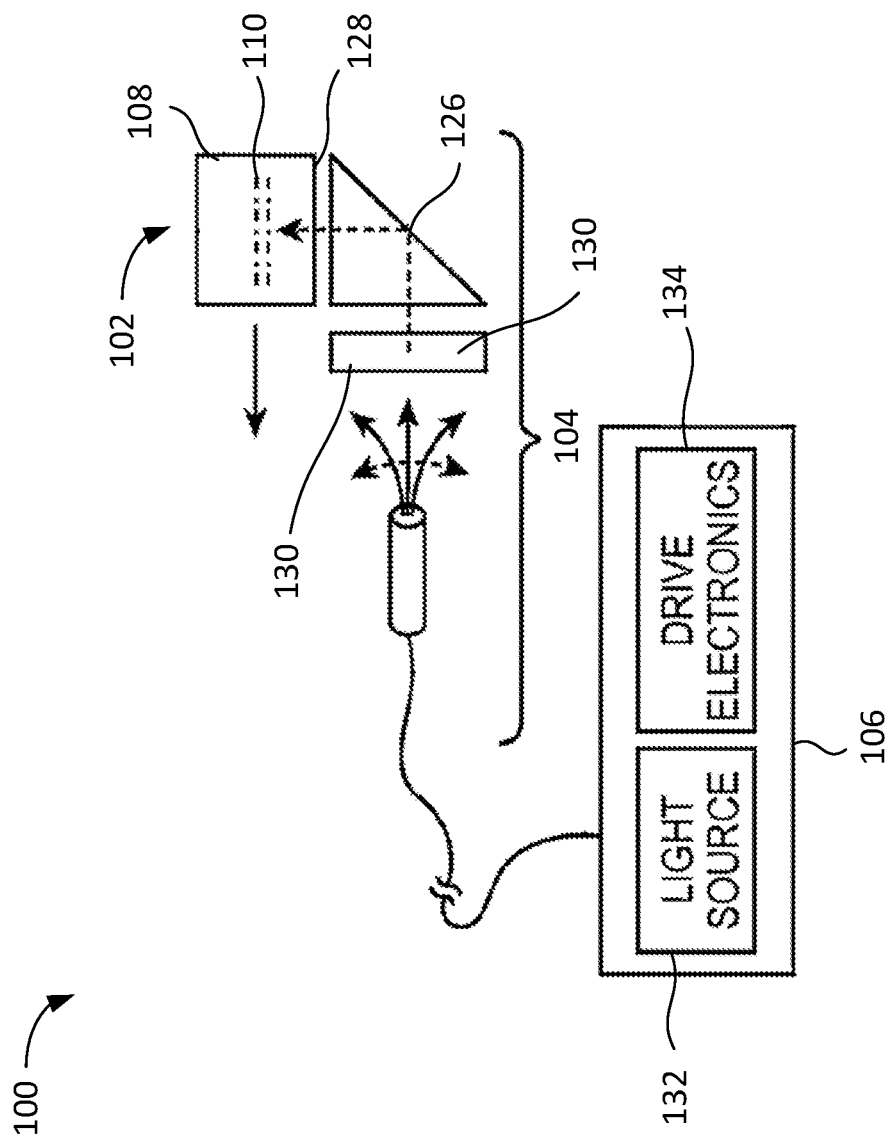
FIG. 1 is a schematic diagram of an example optical system.

FIG. 1 shows an optical system 100 including a waveguide apparatus 102, an optical coupler subsystem 104 to optically couple light to or from the waveguide apparatus 102, and a spatial light modulator 106.

The waveguide apparatus 102 includes one or more primary planar waveguides 108 (only one of which is shown in FIG. 1), and one or more diffractive optical elements (DOEs) 110 associated with each of at least some of the primary planar waveguides 108.

Figure 2:
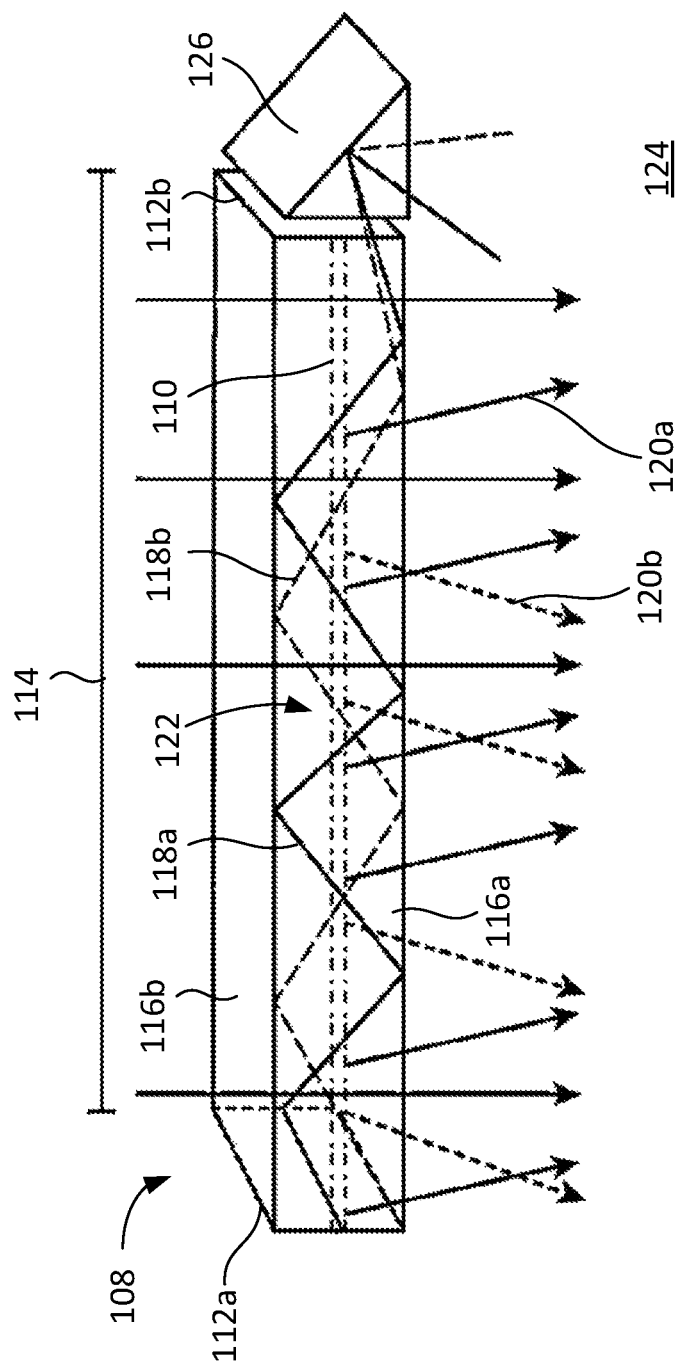
FIG. 2 an elevation view of an example waveguide apparatus.

As shown in FIG. 2, the primary planar waveguides 108 each have at least a first end 112a and a second end 112b, the second end 112b opposed to the first end 112a along a length 114 of the primary planar waveguide 108. The primary planar waveguides 108 each have a first face 116a and a second face 116b, at least the first and the second faces 116a and 116b (collectively 116) forming an at least partially internally reflective optical path (illustrated by arrow 118a and broken line arrow 118b, collectively 118) along at least a portion of the length 114 of the primary planar waveguide 108. The primary planar waveguide(s) 108 may take a variety of forms which provides for substantially total internal reflection (TIR) for light striking the faces 116 at greater than a defined critical angle with respect to the normal of the face. The primary planar waveguides 108 may, for example, take the form of a pane or plane of glass, fused silica, acrylic, or polycarbonate, among other materials.

The DOEs 110 (illustrated in FIGS. 1 and 2 by dash-dot double line) may take a large variety of forms which interrupt the TIR optical path 118, providing a plurality of optical paths (illustrated by arrows 120a and broken line arrows 120b, collectively 120) between an interior 122 and an exterior 124 of the primary planar waveguide 108 extending along at least a portion of the length 114 of the primary planar waveguide 108. In some cases, the DOEs 110 may advantageously combine the phase functions of a linear diffraction grating with that of a circular or radial symmetric lens, allowing positioning of apparent objects and focus plane for apparent objects. Such may be achieved on a frame-by-frame, subframe-by-subframe, or even pixel-by-pixel basis.

With reference to FIG. 1, the optical coupler subsystem 104 optically couples light to, or from, the waveguide apparatus 102. As illustrated in FIG. 1, the optical coupler subsystem may include an optical element 126, for instance a reflective surface, mirror, dichroic mirror or prism to optically couple light to, or from, an edge 128 of the primary planar waveguide 108. The optical coupler subsystem 104 may additionally or alternatively include a collimation element 130 that collimates light.

The spatial light modulator 106 is a control subsystem that includes one or more light sources 132 and drive electronics 134 that generate image data that is encoded in the form of light that is spatially and/or temporally varying (e.g., spatially and/or temporally modulated light). As noted above, a collimation element 130 may collimate the light, and the collimated light can be optically coupled into one or more primary planar waveguides 108.

As illustrated in FIG. 2, the light propagates along the primary planar waveguide 108 with at least some reflections or "bounces" resulting from the TIR propagation. It is noted that some implementations may employ one or more reflectors in the internal optical path, for instance thin-films, dielectric coatings, metalized coatings, etc., which may facilitate reflection. Light propagates along the length 114 of the primary planar waveguide 108 and intersects with one or more DOEs 110 at various positions along the length 114. As explained below in reference to FIGS. 3A-3C, the DOE(s) 110 may be incorporated within the primary planar waveguide 108 or abutting or adjacent one or more of the faces 116 of the primary planar waveguide 108 (e.g., the face 116a or the face 116b). The DOE(s) 110 accomplishes at least two functions. The DOE(s) 110 shift an angle of the light, causing a portion of the light to escape TIR, and emerge from the interior 112 to the exterior 124 via one or more faces 116 of the primary planar waveguide 108. The DOE(s) 110 also focus the out-coupled light at one or more viewing distances. Thus, someone looking through a face 116a of the primary planar waveguide 108 can see digital imagery at one or more viewing distances.

In some cases, each primary planar waveguide 108 can extend substantially along a particular plane (e.g., a x-y plane), and can guide incident light such that light emerges from the primary planar waveguide 108 at one or more locations in directions orthogonal or approximately orthogonal to the plane (e.g., in a z-direction or approximately in the z-direction). In some cases, the surface area of the primary planar waveguide 108 along its plane of extension can be substantially larger than its surface area along other non-parallel (e.g., orthogonal) planes. For example, in some cases, the surface of the primary planar waveguide 108 along the x-y plane can be 10 times larger, 20 times larger, or some other multiple larger than its surface area along the x-z plane or y-z plane.

Figure 3A:
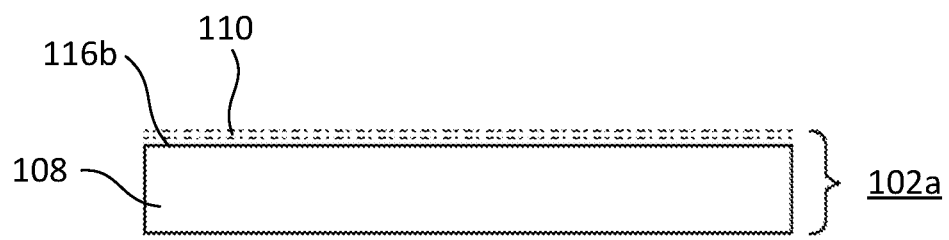
FIGS. 3A-3C are schematic diagram of example waveguide apparatuses.
Figure 3B:
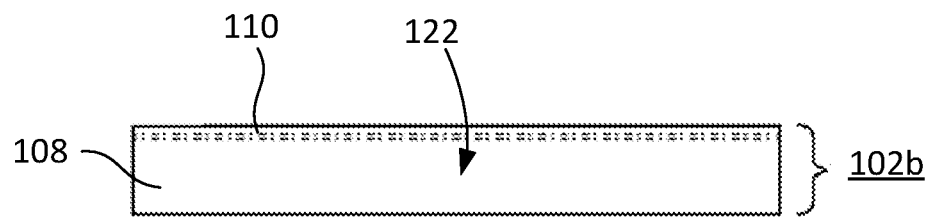
Figure 3C:
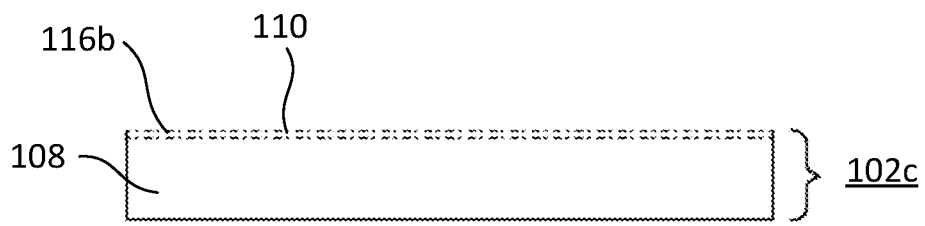

While FIGS. 1 and 2 show the DOE 110 positioned in the interior 112 of the primary planar waveguide 108, spaced from the faces 116, the DOE 110 may be positioned at other locations in other implementations, for example as illustrated in FIGS. 3A-3C.

FIG. 3A shows an example waveguide apparatus 102a including a primary planar waveguide 108 and at least one DOE 110 carried on an outer surface or face 116 of the primary planar waveguide 108. For example, the DOE 110 may be deposited on the outer surface or face 116b of the primary planar waveguide 108, for instance as a patterned metal layer.

FIG. 3B shows another example waveguide apparatus 102b including a primary planar waveguide 108 and at least one DOE 110 positioned internally immediately adjacent an outer surface or face 116b of the primary planar waveguide 108. For example, the DOE 110 may be formed in the interior 122 via selective or masked curing of material of the primary planar waveguide 108. Alternatively, the DOE 110 may be a distinct physical structure incorporated into the primary planar waveguide 108.

FIG. 3C shows another example waveguide apparatus 102c including a primary planar waveguide 108 and at least one DOE 110 formed in an outer surface of the primary planar waveguide 108. The DOE 110 may, for example be etched, patterned, or otherwise formed in the outer surface or face 116b of the primary planar waveguide 108, for instances as grooves. For example, the DOE 110 may take the form of linear or saw tooth ridges and valleys which may be spaced at one or more defined pitches (e.g., space between individual elements or features extending along the length 114). The pitch may be a linear function or may be a non-linear function.

In some cases, the primary planar waveguide 108 can be at least partially transparent. Such a configuration allows one or more viewers to view the physical objects (e.g., the real world) on a far side of the primary planar waveguide 108 relative to a vantage of the viewer. This may advantageously allow viewers to view the real world through the waveguide and simultaneously view digital imagery that is relayed to the eye(s) by the waveguide.

In some implementations a plurality of waveguides systems may be incorporated into a near-to-eye display. For instance, a plurality of waveguides systems may be incorporated into a head-worn, head-mounted, or helmet-mounted display—or other wearable display (e.g., incorporated into an eyepiece that is positioned within a user's field of vision to display digital imagery to the user).

In some implementations, a plurality of waveguides systems may be incorporated into a head-up display (HUD) that is not worn (e.g., an automotive HUD or an avionics HUD in which the display image is projected onto a transparent window in the driver/pilot's line of sight). In such implementations, multiple viewers may look at a shared waveguide system or resulting image field. Multiple viewers may, for example see or optically perceive a digital or virtual object from different viewing perspectives that match each viewer's respective locations relative to the waveguide system.

The optical system 100 is not limited to use of visible light, but may also employ light in other portions of the electromagnetic spectrum (e.g., infrared or ultraviolet) and/or may employ electromagnetic radiation that is outside the band of "light" (e.g., visible, UV, or IR), for example employing electromagnetic radiation or energy in the microwave or X-ray portions of the electromagnetic spectrum.

In some implementations, a scanning light display is used to couple light into a plurality of primary planar waveguides. The scanning light display can include a single light source that forms a single beam that is scanned over time to form an image. This scanned beam of light may be intensity-modulated to form pixels of different brightness levels. Alternatively, multiple light sources may be used to generate multiple beams of light, which are scanned either with a shared scanning element or with separate scanning elements to form imagery. These light sources can include different wavelengths, visible and/or non-visible, they can include different geometric points of origin (e.g., X, Y, or Z), they can enter the scanner(s) at different angles of incidence, and can create light that corresponds to different portions of one or more images (e.g., flat or volumetric, moving or static).

The light may, for example, be scanned to form an image with a vibrating optical fiber, for example as discussed in U.S. patent application Ser. No. 13/915,530, International Patent Application Serial No. PCT/US2013/045267, and U.S. Provisional Patent Application Ser. No. 61/658,355, the contents of which are included by reference in their entirety. The optical fiber may be scanned biaxially by a piezoelectric actuator. Alternatively, the optical fiber may be scanned uniaxially or triaxially. As a further alternative, one or more optical components (e.g., rotating polygonal reflector or mirror, oscillating reflector or mirror) may be employed to scan an output of the optical fiber.

The optical system 100 is not limited to use in producing images or as an image projector or light field generation. For example, the optical system 100 or variations thereof may be employed as an image capture device, such as a digital still or digital moving image capture or camera system.

Figure 4:
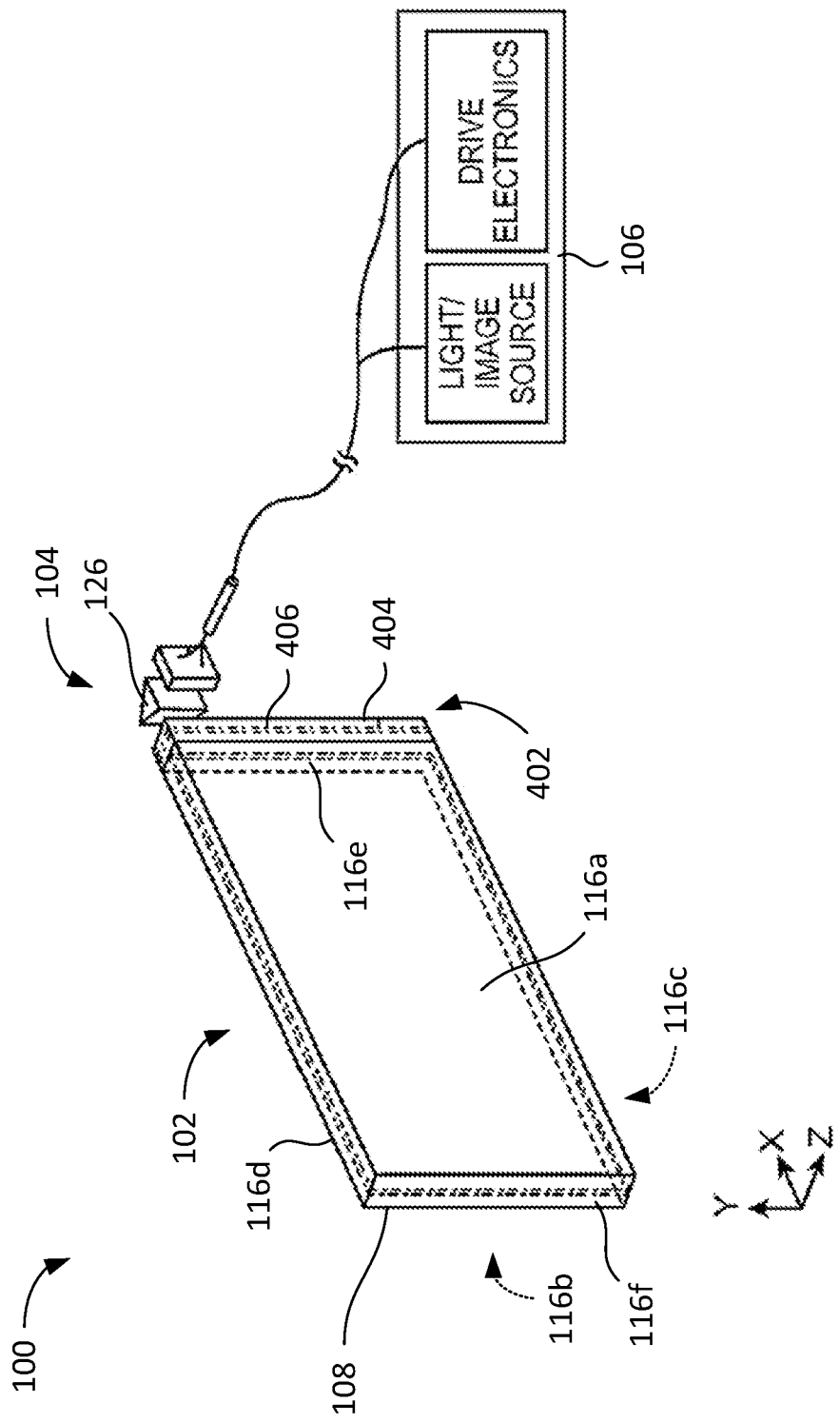
FIG. 4 is a schematic diagram showing another example optical system.

As shown in FIG. 4, in some cases, the optical system can include a distribution waveguide apparatus 402, to relay light along a first axis (e.g., vertical or Y-axis in view of FIG. 4), and expand the light's effective exit pupil along the first axis (e.g., Y-axis). The distribution waveguide apparatus 402, may, for example include a distribution planar waveguide 404 and at least one DOE 406 (illustrated by double dash-dot line) associated with the distribution planar waveguide 404. The distribution planar waveguide 404 may be similar or identical in at least some respects to the primary planar waveguide 108, having a different orientation therefrom. Likewise, the at least one DOE 406 may be similar or identical in at least some respects to the DOE 110. For example, the distribution planar waveguide 404 and/or DOE 406 may be composed, at least in part, of the same materials as the primary planar waveguide 108 and/or DOE 110, respectively The relayed and exit-pupil expanded light is optically coupled from the distribution waveguide apparatus 402 into one or more primary planar waveguide 108. The primary planar waveguide 108 relays light along a second axis, preferably orthogonally to first axis, (e.g., horizontal or X-axis in view of FIG. 4). Notably, the second axis can be a non-orthogonal axis to the first axis. The primary planar waveguide 108 expands the light's effective exit pupil along that second axis (e.g., X-axis). For example, a distribution planar waveguide 404 can relay and expand light along the vertical or Y-axis, and pass that light to the primary planar waveguide 108 which relays and expands light along the horizontal or X-axis.

In a similar manner as described above, light propagates along the primary planar waveguide 108 with at least some reflections or "bounces" resulting from the TIR propagation. Further, light propagates along the length 114 of the primary planar waveguide 108 and intersects with one or more DOEs 110 at various positions along the length 114. The DOE(s) 110 shift an angle of the light, causing a portion of the light to escape TIR, and emerge from the interior 112 to the exterior 124 via one or more faces 116 of the primary planar waveguide 108 (e.g., the face 116a). Further, the DOE(s) 110 focus the out-coupled light at one or more viewing distances. Thus, someone looking through a face 116a of the primary planar waveguide 108 can see digital imagery at one or more viewing distances. In some implementations, at least a portion of the optical system 100 can be incorporated into a head-worn, head-mounted, or helmet-mounted display—or other wearable display (e.g., incorporated into an eyepiece that is positioned within a user's field of vision to display digital imagery to the user).

Additional information regarding optical systems can be found in U.S. patent application Ser. No. 14/331,218, the contents of which are included by reference in their entirety.

As described above, light can be emitted from one or more faces 116 of the primary planar waveguide 108 (e.g., the face 116a) to display digital imagery to a user. However, in some cases, stray light may escape from portions of the optical system 100 in a manner that does not contribute to the digital imagery. For instance, in some cases, light may escape from the primary planar waveguide 108 from faces other than the face 116a. As an example, referring to FIG. 4, light may escape from one or more of faces 116b (facing in the negative z-direction), 116c (facing in the negative y-direction), 116d (facing in the positive y-direction), 116e (facing in the positive x-direction) and/or 116f (facing in the negative x-direction). As another example, some of the light emitted by the optical coupler subsystem 104 light may escape to the exterior 124 rather than being coupled to the waveguide apparatus 102 and/or the distribution waveguide apparatus 402. As another example, some of the light emitted by the waveguide apparatus 402 light may escape to the exterior 124 rather than being coupled to the waveguide apparatus 102.

In some cases, stray light can negatively affect the performance of the optical system 100. For instance, stray light can decrease the image quality of the digital imagery rendered by the optical system 100 (e.g., by decreasing the resolution of the projected digital imagery, reducing the contrast of the digital imagery, introducing undesired image artifacts, and/or impairing the accurate reproduction of color).

To improve image quality, the optical system can include one or more light directing and/or light absorbing components to redirection and/or capture stray light.

Figure 5:
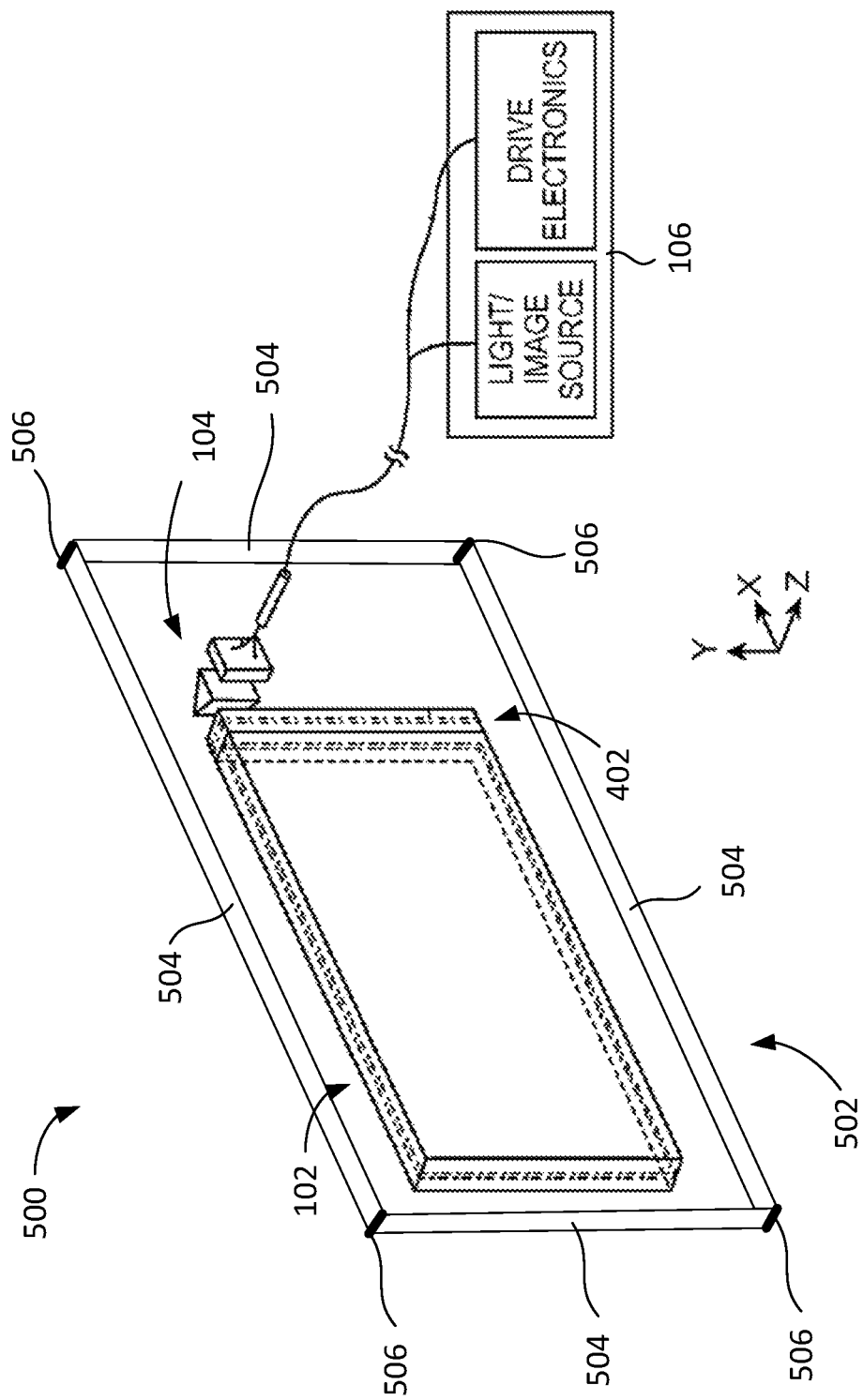
FIG. 5 is a schematic diagram showing another example optical system including a light absorption assembly.

As an example, FIG. 5 shows an optical system 500. The optical system 500 is similar in many respects to the optical system shown FIG. 4. For example, the optical system 500 includes a waveguide apparatus 102, an optical coupler subsystem 104 to optically couple light to or from the waveguide apparatus 102 through a distribution waveguide apparatus 402, and a spatial light modulator 106. In some implementations, at least a portion of the optical system 500 can be incorporated into a head-worn, head-mounted, or helmet-mounted display—or other wearable display (e.g., incorporated into an eyepiece that is positioned within a user's field of vision to display digital imagery to the user).

In this example, the optical system 500 also includes a light absorption assembly 502. The light absorption assembly 502 includes one or more waveguides 504, and one or more light absorbing elements 506. The one or more waveguides 504 are positioned on or around a periphery of other components of the optical system 500 (e.g., the waveguide apparatus 102, the optical coupler subsystem 104, and/or the distribution waveguide apparatus 402) to collect stray light emitted by those components. In turn, the waveguides 504 direct the captured light to one or more of the light absorbing elements 506, whereby the stray light is absorbed (e.g., converted into heat). Accordingly, the amount of stray light escaping from the optical system 500 is reduced.

Figure 6:
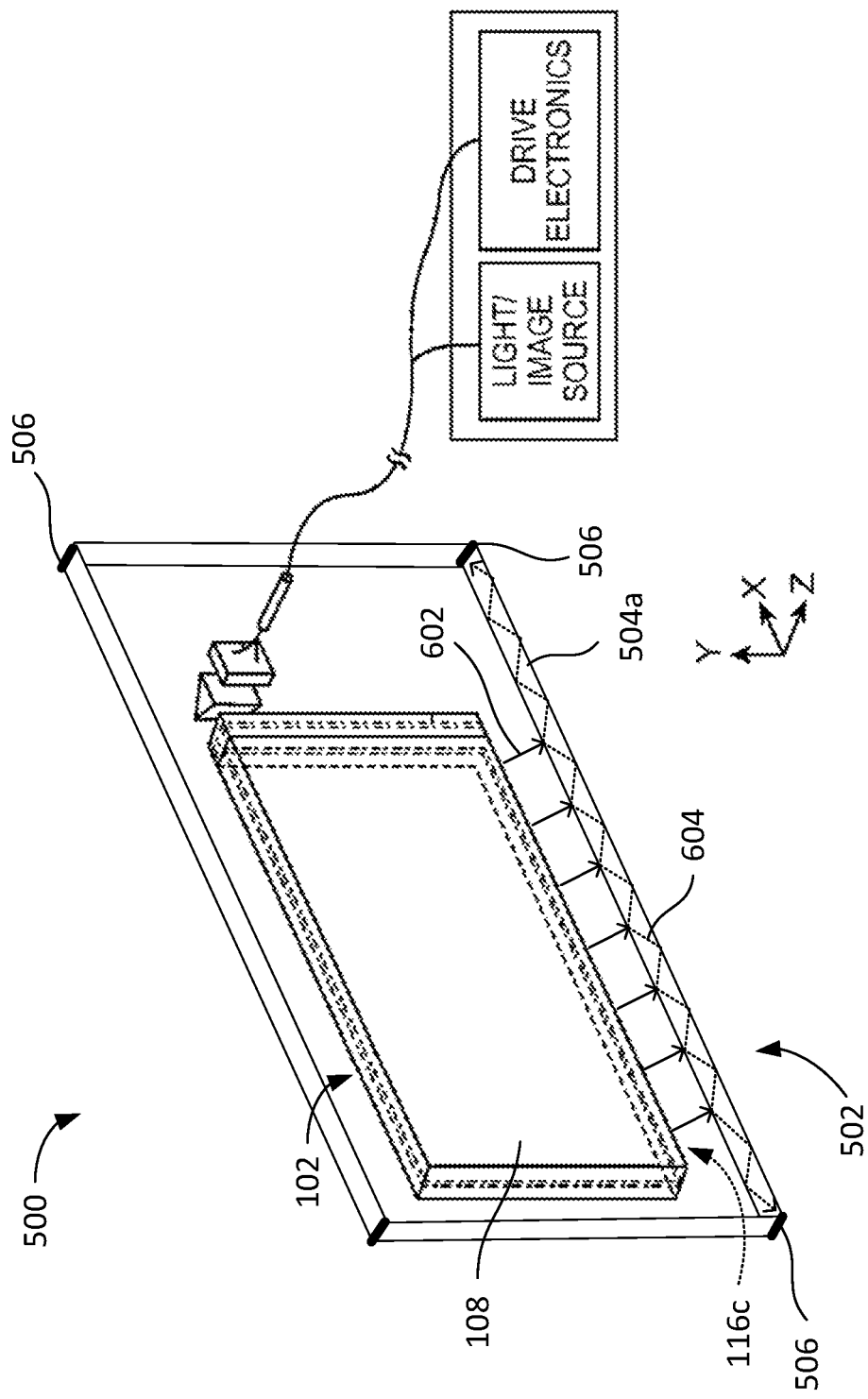
FIG. 6 is a schematic diagram showing an example absorption of stray light using the optical system shown in FIG. 5.

As an example, FIG. 6 shows stray light (depicted as solid arrowed lines 602) escaping from the face 116c of the primary planar waveguide 108. The stray light 602 strikes a waveguide 504a positioned along a periphery of the primary planar waveguide 108, and enters the waveguide 504a. In turn, the waveguide 504a directs the stray light to light absorbing elements 506a and/or 506b (example paths of the stray light within the waveguide 504a are shown as dotted arrowed lines 604), whereby the stray light is absorbed. Accordingly, the amount of stray light from the face 116c of the primary planar waveguide 108 to the exterior of the optical system 500 is reduced.

The waveguides 504 can direct captured light to the light absorbing elements 506 through total internal reflection. Total internal reflection is a phenomenon which occurs when a propagated light wave strikes a medium boundary surface at an angle larger than a particular critical angle with respect to the normal to the surface. If the refractive index is lower on the other side of the boundary and the incident angle is greater than the critical angle, the wave cannot pass through and is entirely (or substantially entirely) reflected. The critical angle is the angle of incidence above which the total internal reflection occurs.

Accordingly, the waveguides 504 can be configured such that its refractive index is greater than the refractive index of the surrounding medium. As an example, if the waveguides 504 are positioned with an air gap between other components of the optical system 100 from which stray light may escape (e.g., components of the waveguide apparatus 102, the optical coupler subsystem 104, and/or the distribution waveguide apparatus 402), the waveguides 504 can be constructed using a substance having a refractive index greater than air. As another example, if the waveguides 504 are positioned such that they directly abut other components of the optical system 100 from which stray light may escape (e.g., components of the waveguide apparatus 102, the optical coupler subsystem 104, and/or the distribution waveguide apparatus 402), the waveguides 504 can be constructed using a substance having a refractive index greater than that of the abutting component.

Further, to facilitate propagation of the entered light along the length of the waveguide 504 through total internal reflection, each the waveguide 504 can include one or more optical structures that modify the direction of light upon entry into the waveguide 504, such that it propagates within the waveguide 504 at an angle greater than the critical angle.

Figure 7:
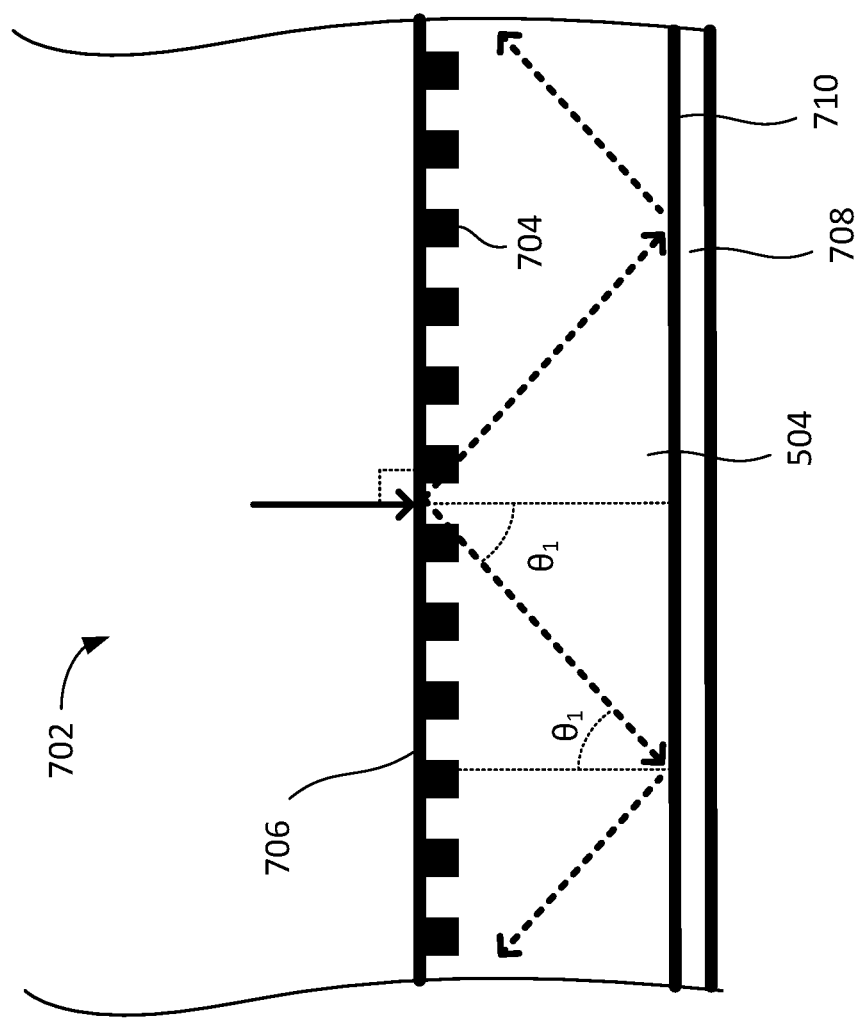
FIG. 7 is a cross-section diagram of an example waveguide of a light absorption assembly.

As an example, FIG. 7 shows a cross-section of a waveguide 504 and an example surrounding medium 702. In some cases, the medium 702 can be air or some other ambient substance (e.g., if the waveguide 504 is positioned with an air gap or other ambient substance between other components of the optical system 100). In some cases, medium 702 can be another component of the optical system 100 (e.g., if the waveguide 504 is positioned such that it directly abuts that component).

The waveguide 504 includes optical structures 704 positioned along a surface 706 of the waveguide 504. When light (e.g., stray light escaping from another component of the optical system 100) is incident upon the surface 706, the light enters the waveguide 504, and its propagation direction is modified by the optical structures 704. For example, as shown in FIG. 7, light incident upon the surface 706 at a direction normal to the surface 706 enters the waveguide 504, and is redirected at an angle $\theta_1$ with respect to the normal by the optical structures 704. If the angle $\theta_1$ is greater than the critical angle $\theta_c$ of the interface between the waveguide 504 and the medium 702, the light propagates along the length of the waveguide 504 through total internal reflection (e.g., until it reaches one or more of the light absorbing elements 506). In some cases, the critical angle $\theta_c$ can be defined by the relationship $\sin(\theta_c)=n_1/n_2$, where $n_1$ is the refractive index of the medium 602, $n_2$ is the refractive index of the waveguide 504, and $n_2 > n_1$. In practice, $n_1$ and/or $n_2$ can be selected to obtain a particular $\theta_c$ that enables captured light to propagate across the length of the waveguide 504 through total internal reflection, and can vary depending on the implementation.

In some cases, the optical structures 704 can be gratings positioned on or defined on the surface 706. The gratings can diffract light entering the waveguide 504, such that the light propagates along a direction different than the angle of incidence.

For example, gratings can be etched onto the surface 705 (e.g., by etching ridges or rulings along the surface 605). As another example, additional optically conductive structures can be positioned onto the surface 706 (e.g., adhered, bonded, fused, or otherwise secured to the surface 706). Further, the dimensions of the gratings can differ, depending on the implementation. In some cases, different pitches can be used, depending on the stray light expected to be incident on the waveguide 504. For example, gratings having a pitch of 330 nm can be used to modify the propagation direction of blue stray light. As another example, gratings having a pitch of 380 nm can be used to modify the propagation direction of green stray light. As another example, gratings having a pitch of 470 nm can be used to modify the propagation direction of red stray light. In some case, gratings can be binary (e.g., alternating between two elevations in a stepwise manner), multi-step (e.g., alternating between three elevations in a sequential manner), and/or blazed (e.g., having repeating angled elevations). The pitch may be a linear function or may be a non-linear function. Further, the duty cycle of the gratings (e.g., the length of the grating having a first elevation vs. the total length of the grating) can vary. For example, in some cases, the duty cycle can be 50%, or some other percentage (e.g., 10%, 20%, 30%, or any other percentage).

In some cases, the optical structures 7084 can be other structures that alter the propagation of light. For example, at least some of the optical structures 704 can be lenses and/or surface plasmonics.

A waveguide 504 can be constructed using various materials. As examples, a waveguide 504 can be constructed using glass, fused silica, acrylic, polycarbonate, and/or other materials.

In some cases, a waveguide 504 can include a reflector to facilitate propagation of light along the length of the waveguide 504. For instance, a waveguide 504 can include a reflector along one or more surfaces of its outer periphery (e.g., along a surface facing away from a source of stray light), such that light propagating within the waveguide 504 is reflected away from that surface, and does not escape. As an example, as shown in FIG. 7, a waveguide 504 can include a reflector 708 positioned along a surface 710 facing away from the source of incident light (e.g., opposite the surface 706). Light propagating through the waveguide 504 is reflected by the reflector 708, and cannot substantially pass through the surface 710 to the exterior.

In some case, a reflector can be planar surface defined on or positioned on a surface of the waveguide 504. In some cases, the reflector can be implemented by metalizing a surface of the waveguide 504 (e.g., to deposit a layer of reflective metallic substance onto the surface, such as aluminum or silver).

In some cases, the gratings of a waveguide 504 also can be metalized (e.g., to produce a blazed reflector). For instance, a cross-section of a blazed reflector can include a series of right angle triangles in a "train" (e.g., a repeating series of right angle triangles placed end to end). This can be useful, for example, to direct light within the waveguide 504 in such a way as to achieve larger angles with respect to the normal. As an example, this arrangement can be used to increase the efficiency of diffraction. Further, this arrangement can enable larger incoming angles to be directed more efficiently.

A light absorbing element 506 absorbs some or all of the light incident upon it (e.g., by converting the light into heat). Light absorbing elements 506 can be positioned such that they abut one or more ends of a waveguide 504, such that light propagating along the length of the waveguide 504 is incident upon a light absorbing element 506 and absorbed. In some cases, the light absorbing elements 506 can be positioned such that they are located out of a field of view of a user during operation of the optical system. For example, if the optical system is used as a part of an eyepiece of a head-mounted display, the light absorbing elements 506 can be positioned such that they are out of the field of view of a user while the user is wearing the head-mounted display. In some cases, a light absorbing element 506 can be constructed from an optically dark material (e.g., "carbon black"), such as tar or a UV curable black polymer material.

In the example shown in FIG. 6, stray light escaping from the face 116c of the primary planar waveguide 108 is redirected and absorbed by the light absorption assembly 502. However, this is merely an illustrative example. It is understood that the light absorption assembly 502 can be used to absorb stray light emitted by any of the components of the optical system via appropriately positioned waveguides 504 and light absorbing elements 506. As an example, the light absorption assembly 502 can be used to absorb stray light emitted from one or more of the faces 116b-f As another example, the light absorption assembly 502 can be used to absorb stray light emitted from the optical coupler subsystem 104 (e.g., the optical element 126 and/or the collimation element 130). As another example, the light absorption assembly 502 can be used to absorb stray light emitted from the distribution waveguide apparatus 402.

Further, although an example arrangement of the light absorption assembly 502 is shown in FIGS. 5 and 6, it is understood that this is merely an illustrative example. In practice, the arrangement of the light absorption assembly 502, depends on the implementation.

Figure 8:
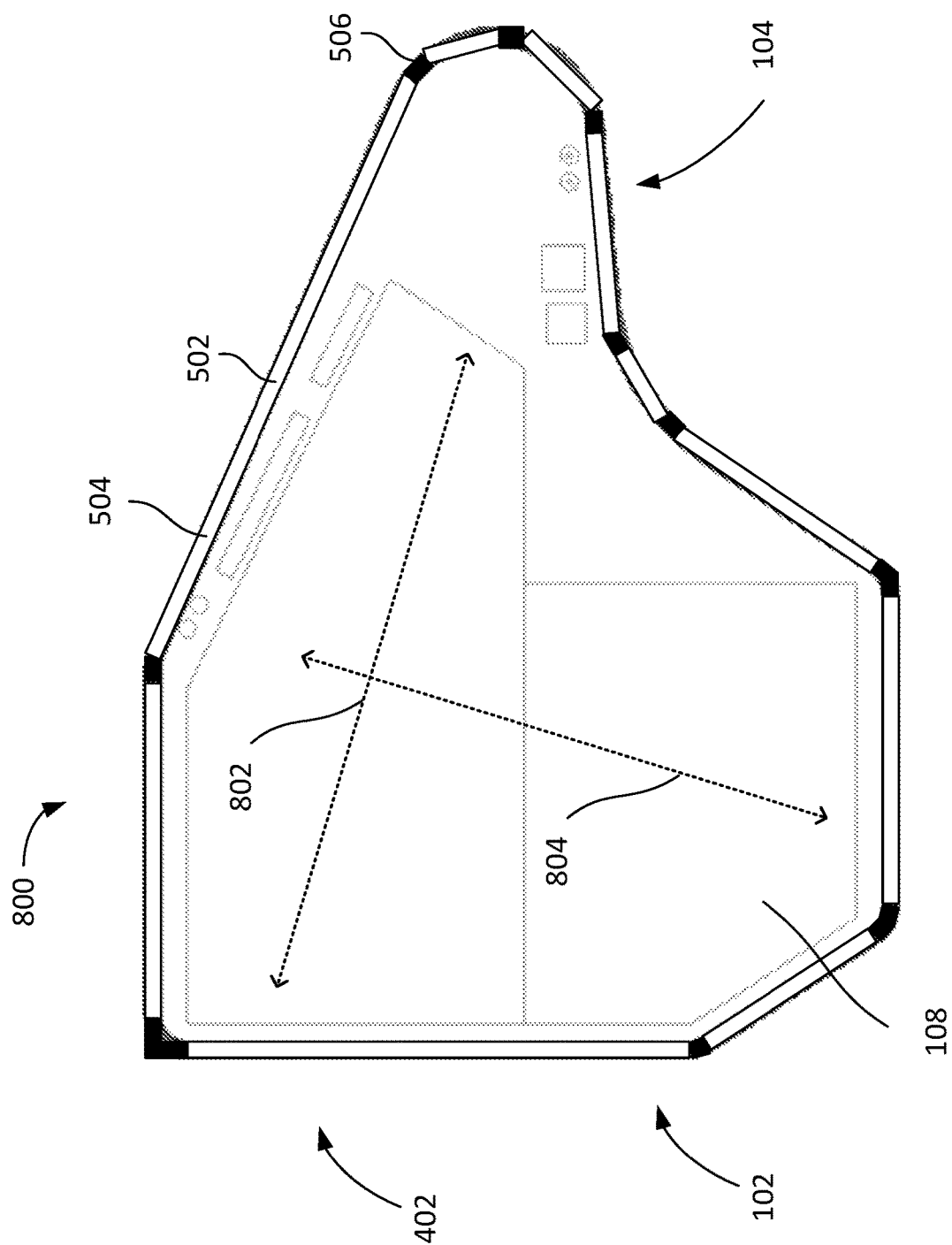
FIG. 8 is a diagram of an example optical assembly including a waveguide apparatus, an optical coupler subsystem, and a distribution waveguide apparatus.

As an example, FIG. 8 shows an example optical assembly 800. The optical assembly 800 includes a waveguide apparatus 102 (e.g., including a primary planar waveguide 108), an optical coupler subsystem 104, and a distribution waveguide apparatus 402 integrally formed as a single component. Portions of, or the entirety of the optical assembly 800 can be composed of glass, fused silica, acrylic, or polycarbonate, among other materials.

The optical assembly 800 can be used in conjunction with a spatial light modulator 106 to display digital imagery to a user. For example, at least a portion of the optical assembly 800 can be incorporated into a head-worn, head-mounted, or helmet-mounted display—or other wearable display (e.g., incorporated into an eyepiece that is positioned within a user's field of vision to display digital imagery to the user).

In a similar manner as described above, the optical coupler subsystem 104 is configured to optically couple light to or from the waveguide apparatus 102 through a distribution waveguide apparatus 402. The distribution waveguide apparatus 402 is configured to relay light along a first axis 802, and expand the light's effective exit pupil along the first axis 802. Further, the relayed and exit-pupil expanded light is optically coupled from the distribution waveguide apparatus 402 into the waveguide apparatus 102. The waveguide apparatus 102 (e.g., using a primary planar waveguide 108) relays light along a second axis 804, and expands the light's effective exit pupil along the second axis 804. In some cases, the second axis 804 can be orthogonal to the first axis 802. In some cases, the second axis 804 can be non-orthogonal to the first axis 802.

Further, in a similar manner as described above, light propagates along the primary planar waveguide 108 with at least some reflections or "bounces" resulting from the TIR propagation. Further, light propagates along the primary planar waveguide 108 and intersects with one or more DOEs of the primary planar waveguide 108 at various positions along the length. The DOE(s) 110 shift an angle of the light, causing a portion of the light to escape TIR, and emerge from the interior of the optical assembly 800 to the exterior via one or more faces of the primary planar waveguide 108. Further, the DOE(s) 110 focus the out-coupled light at one or more viewing distances. Thus, someone looking through the faces of the primary planar waveguide 108 (e.g., from a position above the page, in a direction towards the primary planar waveguide 108) can see digital imagery at one or more viewing distances.

In this example, the optical assembly 800 also includes a light absorption assembly 502. In a similar manner as described above, the light absorption assembly 502 includes one or more waveguides 504, and one or more light absorbing elements 506. The one or more waveguides 504 are positioned around a periphery of the optical assembly 800, such that they surround or substantially surround the components of the optical assembly 800 (e.g., the waveguide apparatus 102, the optical coupler subsystem 104, and the distribution waveguide apparatus 402), and collect stray light emitted by those components. In turn, the waveguides 504 direct the captured light to one or more of the light absorbing elements 506, whereby the stray light is absorbed. Accordingly, the amount of stray light escaping from the optical assembly 800 is reduced.

Although an example arrangement of the light absorption assembly 502 is shown in FIG. 8, this is merely an illustrative example. In practice, the position of each waveguide 504 and light absorbing element 506 can differ, depending on the implementation. Further, in practice, the light absorption assembly 502 can include different numbers of waveguides 504 and/or light absorbing elements 506 than that shown in FIG. 8

Figure 9:
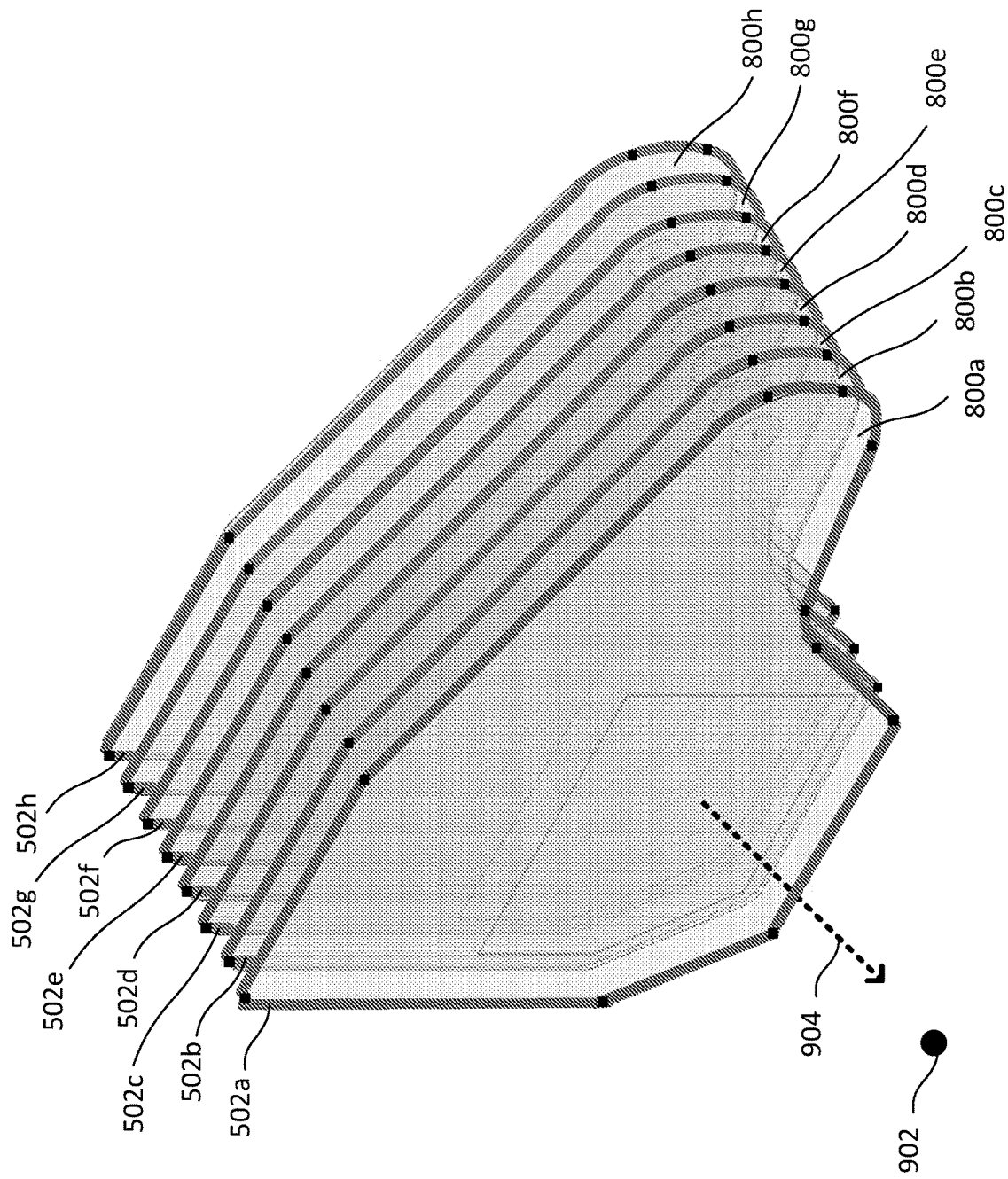
FIG. 9 is a diagram of an example arrangement of multiple optical assemblies.

In some cases, multiple optical assemblies 800 can be used in conjunction to display digital imagery to a user. For example, FIG. 9 shows eight optical assemblies 800a-h arranged in a sequence (e.g., in a stack, with the optical assemblies aligned with one another). For ease of illustration, the optical assemblies 800 are illustrated with gaps between them (e.g., an "exploded view"). However, in practice, the distance between each of the sets can be smaller than illustrated in FIG. 8. For example, the sets can be positioned such that each optical assembly 800a-h abuts or is in close proximity to each adjacent optical assembly 800a-h.

In some implementations, at least a portion of the optical assemblies 800a-h can be incorporated into a head-worn, head-mounted, or helmet-mounted display—or other wearable display (e.g., incorporated into an eyepiece that is positioned within a user's field of vision to display digital imagery to the user).

Further, in some cases, each of the optical assemblies 800a-h can be configured to project digital imagery using a different respective color and/or a different depth of view, such that when optical assemblies 800a-h are viewed by a user (e.g., from a position 902, along a direction 904 normal to the optical assemblies 800a-h), the digital imagery projected by each of the optical assemblies 800a-h are overlaid, giving the appearance of a single multi-colored, depth-dependent image (e.g., a multi-colored image that appears to be three-dimensional).

Further, as shown in FIG. 9, each of the optical assemblies 800a-h can include a respective light absorption assembly 502a-h to capture and absorb stray light, thereby improving the image quality of the digital imagery.

In some cases, the thickness of each of the light absorption assemblies 502a-h can be substantially equal to or less than the thickness the rest of its respective optical assembly 800a-h. This can be useful, for example, as it enables the optical assemblies 800a-h to be placed in close proximity with one another or such that they abut one another without obstruction.

In one or more of example implementations described above, light absorbing elements can be positioned at the longitudinal ends of a waveguide to absorb light. For example, referring to FIG. 8, light absorbing elements 506 can be positioned at the longitudinal ends of each of the waveguides 502 (e.g., on a surface substantially perpendicular to the axis of light propagation through the waveguide), such that each light absorbing element is positioned between two adjacent waveguides. Light incident upon a waveguide is directed to a longitudinal end of that waveguide, whereby is it absorbed by a light absorbing element.

Figure 10:
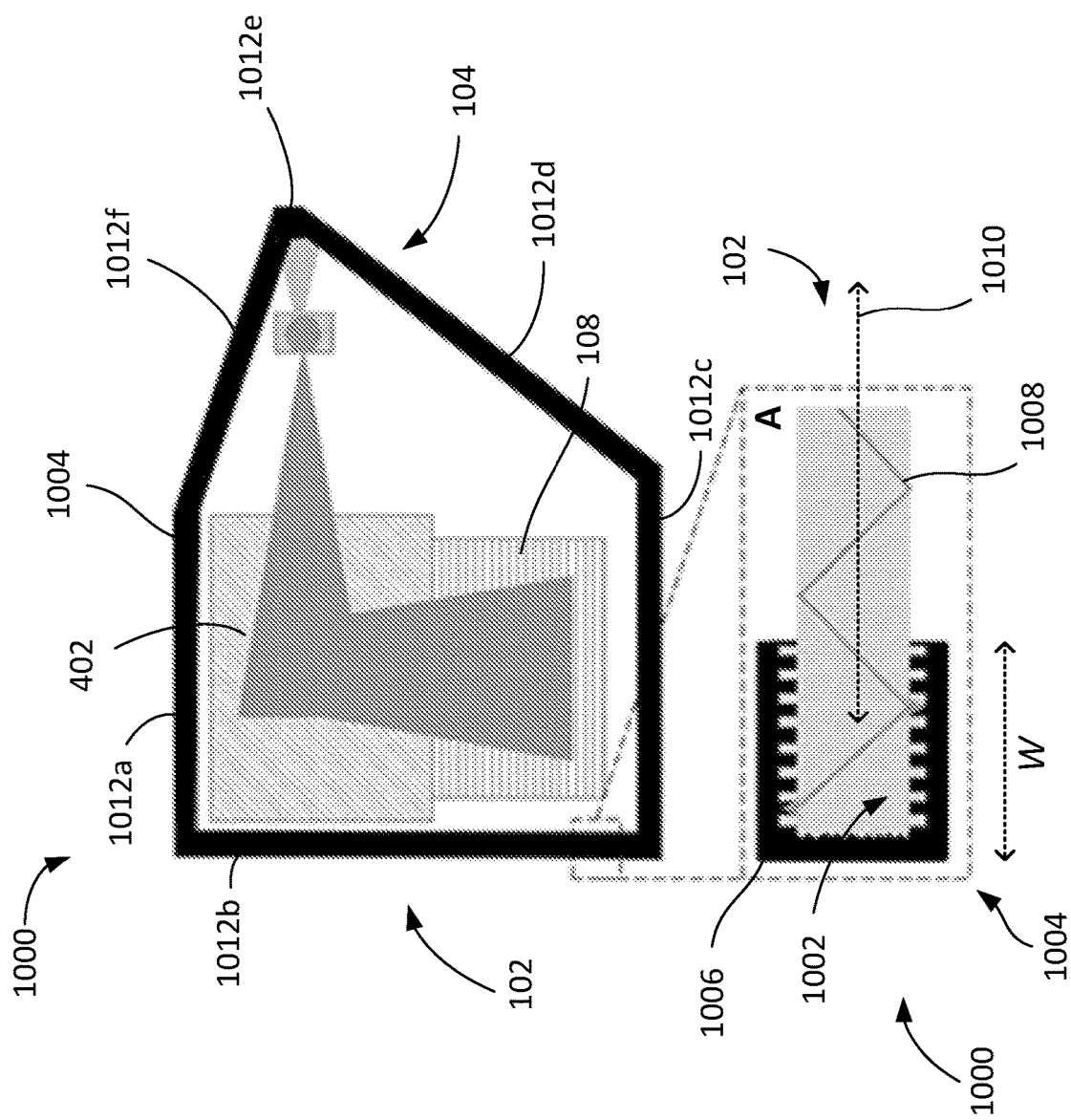
FIG. 10 is a schematic diagram of an example optical assembly.

However, in some cases, light absorbing elements can be positioned along one or more lateral or peripheral edges of a waveguide (e.g., on a surface substantially parallel to the axis of light propagation through the waveguide). As an example, FIG. 10 shows a schematic diagram of an optical assembly 1000 according to an overhead view. The optical assembly 1000 can be similar to the optical assembly 800 shown on FIG. 8. For example, the optical assembly 1000 includes a waveguide apparatus 102 (e.g., including a primary planar waveguide 108), an optical coupler subsystem 104, and a distribution waveguide apparatus 402 integrally formed as a single component. Portions of, or the entirety of the optical assembly 1000 can be composed of glass, fused silica, acrylic, polycarbonate, lithium niobate, lithium tantalate, or particle-doped polymer resins, among other materials.

Inset A of FIG. 10 shows a cross-sectional view of a portion of the optical assembly 1000. As shown in inset A of FIG. 10, a pattern of gratings 1002 is defined on at least one of a top and bottom face of the waveguide apparatus 102 along the peripheral edge 1004 of the waveguide apparatus 102. Further, a layer of light absorbing material 1006 is deposited over the gratings 1002. The waveguide apparatus 102 guides stray light 1008 (e.g., stray light escaping from the primary planar waveguide 108 and/or distribution waveguide apparatus 402) towards the peripheral edge 1004 along an axis of light propagation 1010, with some reflections or "bounces" resulting from the TIR propagation. Upon reaching the gratings 1002, the angle of propagation of the stray light 1008 is altered to facilitate the stray light entering the light absorbing material 1006. The stray light 1008 is emitted from the waveguide apparatus 102 and is absorbed by the light absorbing material 1006. Accordingly, the stray light 1008 is contained within the optical assembly 1000, thereby improving the image quality of the digital imagery.

In some cases, the width W of the gratings 1002 and the light absorbing material 1006 can be selected such that stray light 1008 bounces at least two times along the width W as it propagates through the waveguide apparatus 102 through TIR. Accordingly, the gratings 1002 and the light absorbing material 1006 can incrementally extract and absorb stray light across multiple different bounces of light. This can be useful, for example, in improving the performance of light absorption. For example, upon a first bounce of stray light within the width W, the gratings 1002 and the light absorbing material 1006 might only be capable of absorbing a portion of the light (e.g., absorb 90% of light, leaving 10% remaining). Upon the second bounce of stray light within the width W, the gratings 1002 and the light absorbing material 1006 can absorb some or all of the remaining light (e.g., absorb 90% of the remaining light, leaving 1% remaining of the original light). Further, this grating pattern 1002 near the peripheral edge 1004 of the waveguide 102 can be particularly useful in embodiments in which higher index substrates are used as waveguides, as the tendency of light reflecting back in TIR is higher. In practice, light absorbing materials might not have a sufficient high index of refraction to match those of higher index substrates (e.g., n>1.8). Accordingly, the use of gratings and light absorbing materials along a sufficient large width W near at least a portion of the peripheral edge of the waveguide can improve the light performance characteristics of the optical apparatus in these situations.

The dimensions and design of grating pattern 1002 can be tuned for particular wavelengths of light. For example, a grating pattern can be selected to optimally outcouple red light from the high index waveguide into the lower index light absorbing material. One of skill in the art will appreciate that the grating pattern could also be tuned for green, blue, or any other wavelength of light. In some embodiments, the high index waveguide can support total internal reflection of more than one wavelength of light. In such an embodiment, the grating pattern can be designed to outcouple more than one wavelength of light. One way to achieve outcoupling of multiple wavelengths or a large range of wavelengths, is to tune a first portion of the grating pattern for a first wavelength, tune a second portion of the grating pattern for a second wavelength, and so on for as many wavelengths as are supported by the waveguide. In some embodiments, the first portion is along a peripheral edge of the waveguide and the second portion is adjacent the first portion toward the center of the waveguide.

In some cases, the light absorbing material 1006 can be a similar material as that used to construct the light absorbing elements 506 described above. For example, the light absorbing material 1006 can be an optically dark material (e.g., "carbon black"), such as tar or a UV curable black polymer material. Further, in some cases, the light absorbing material 1006 can be applied to the peripheral edge 1004 in a liquid form (e.g., injected onto the peripheral edge 1004 and/or a mold), and cured into a solid form. In some cases, the gratings 1002 can be used to regulate the volume and/or distribution of light absorbing material 1006 onto the peripheral edge 1004. For example, the dimension of the gratings 1002 (e.g., height of each grating, width of each grating, pitch of the grating, grating direction, volume of space defined by the gratings, etc.) can be selected to control the deposition of the light absorbing material 1006 while it is in a liquid form (e.g., through capillary forces) and enhance light diffraction/extraction efficiency.

In the example shown in FIG. 10, the gratings 1002 and the light absorbing material 1006 are distributed about the entire peripheral edge 1004 of the waveguide apparatus 102. However, this need not be the case. As an example, the gratings 1002 can be defined along one or more selected portions of the peripheral edge 1004 (e.g., along portions of the waveguide apparatus 102 that encounter a greater amount of stray light). As another example, the light absorbing material 1006 also can be deposited along one or more selected portions of the peripheral edge 1004). Referring to FIG. 10, in some cases, edge segments 1012*a-c* can include gratings 1002 and light absorbing material 1006, while gratings 1002 and light absorbing material 1006 are omitted from edge segments 1012*d-f*. In practice, other configuration as also possible, depending on the implementation.

In some cases, the shape of the optical assembly can also be designed to facilitate the absorption of stray light. For instance, the optical assembly can be shaped such that stray light emitted by a particular component is more likely to be reflected away from that component, such that it does not re-couple to the optical pathways of the optical assembly 100.

Figure 11A:
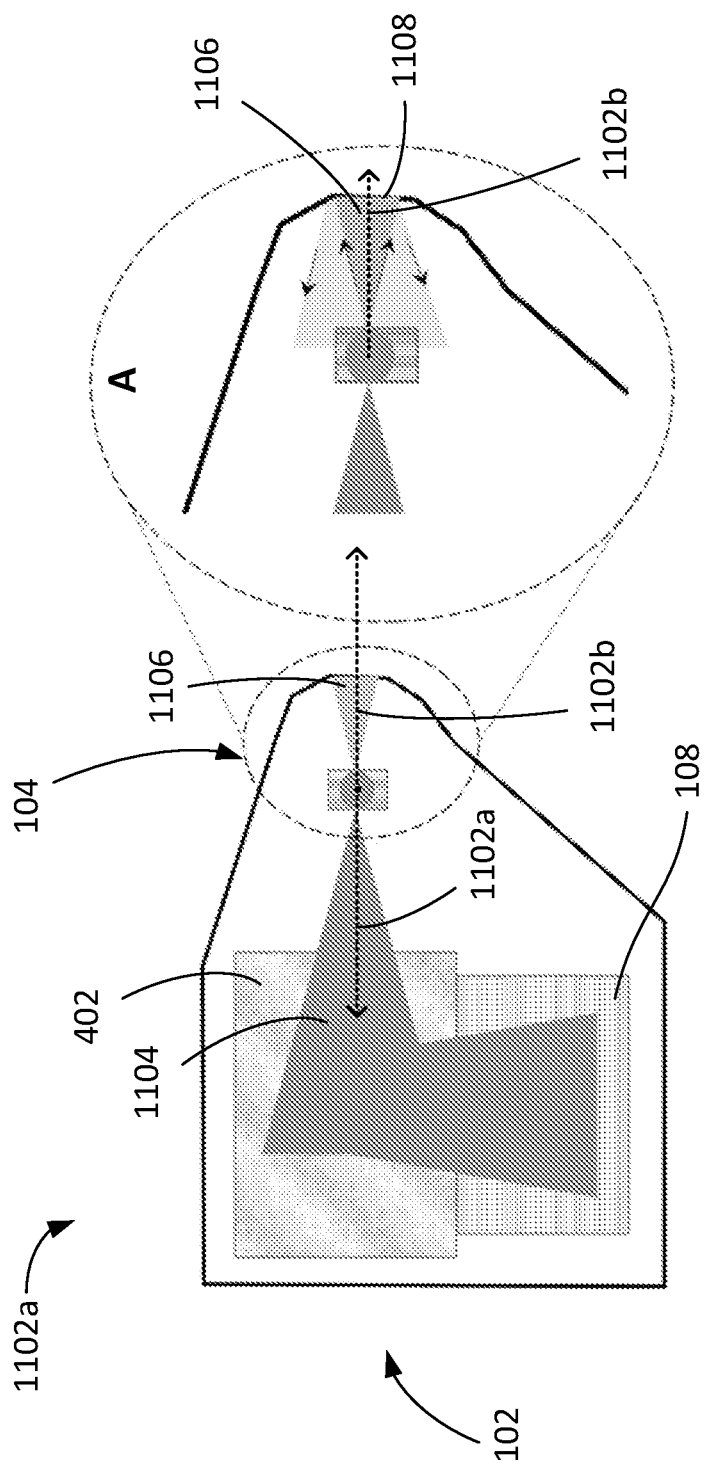
FIGS. 11A-11C are schematic diagram of example optical assemblies.

As an example, FIG. 11A shows a schematic diagram of an optical assembly 1100*a* according to an overhead view. The optical assembly 1100*a* can be similar to the optical assembles 800 and 1000 shown on FIGS. 8 and 10. For example, the optical assembly 1100*a* includes a waveguide apparatus 102 (e.g., including a primary planar waveguide 108), an optical coupler subsystem 104, and a distribution waveguide apparatus 402 integrally formed as a single component. Portions of, or the entirety of the optical assembly 1000 can be composed of glass, fused silica, acrylic, or polycarbonate, among other materials. In some embodiments, the optical assembly 1000 includes a high index material, such as high index glass, polymer, doped polymer, lithium niobate, or lithium tantalate.

In this example, the optical coupler subsystem 104 is configured to emit light 1104 along a primary emission axis 1102*a*. However, due to practical limitations (e.g., physical and design limitations), the optical coupler subsystem 104 also emits some stray light 1106 along a secondary emission axis 1102*b*, in a direction opposite that of the primary emission axis 1102*a*. As shown in inset A of FIG. 11A, the peripheral edge 1108 of the waveguide apparatus 102 in the path of stray light 1106 is substantially perpendicular to the second emission axis 1102*b*. Accordingly, at least some of the stray light 1106 is reflected from the peripheral edge 1108, and propagated back towards the optical coupling subsystem 104 and the distribution waveguide apparatus 402. This could negatively impact the performance of the optical assembly (e.g., due to re-coupling of stray light to the optical pathways of the optical assembly, which could degrade image quality of the digital imagery).

These effects can be mitigated by designing the optical assembly such that the peripheral edges of the waveguide apparatus 102 are inclined with respect to the primary emission axis 1102*a* and the secondary emission axis 1102*b* (e.g., substantially not perpendicular to the axes 1102*a* and 1102*b*). As an example, FIG. 11B shows a schematic diagram of a portion of an optical assembly 1100*b* according to an overhead view. In this example, the optical assembly 1100*b* includes two peripheral edges 1110*a* and 1110*b* along the secondary emission axis 1102b. The peripheral edges 1110a and 1110b are inclined with respect to the primary emission axis 1102a and the secondary emission axis 1102b. Accordingly, the stray light 1106 is not reflected back towards the optical coupling subsystem 104 (e.g., propagating along axes 1112a and 1112b instead). Accordingly, stray light is less likely to re-couple to the optical pathways of the optical assembly.

Figure 11C:
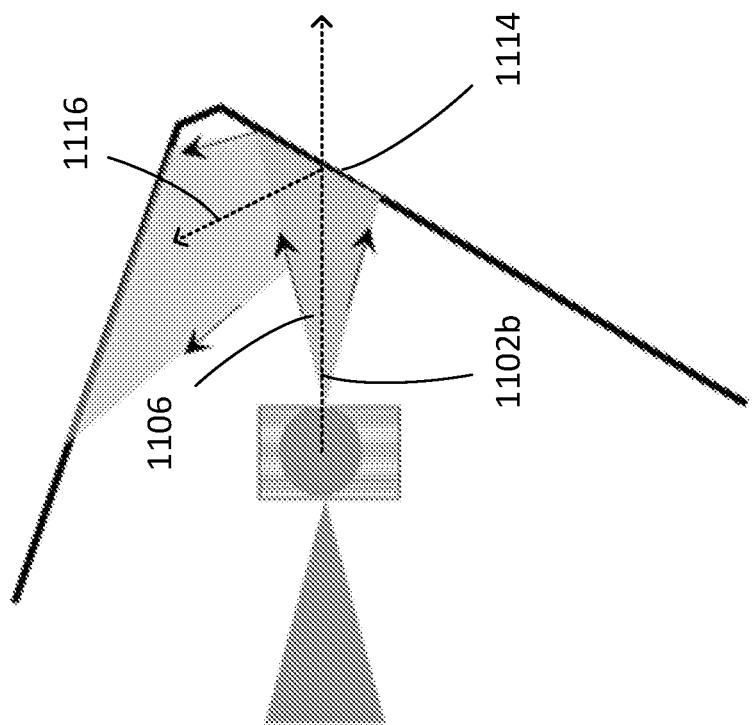
Figure 11B:
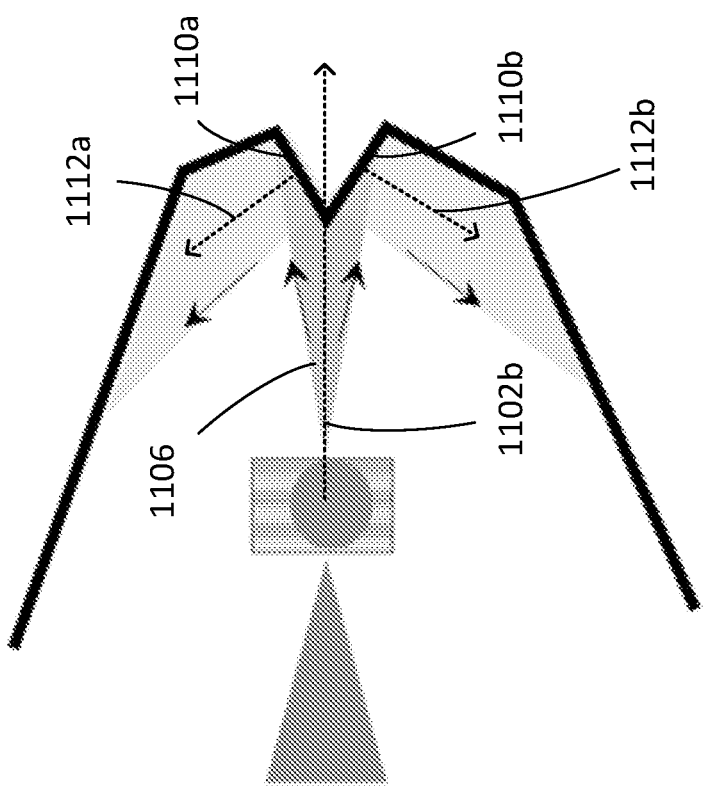

As another example, FIG. 11C shows a schematic diagram of a portion of an optical assembly 1100c according to an overhead view. In this example, the optical assembly 1100c includes a peripheral edge 1114 along the secondary emission axis 1102b. The peripheral edges 1110a and 1110b are included with respect to the primary emission axis 1102a and the secondary emission axis 1102b. Accordingly, the stray light 1106 is not reflected back towards the optical coupling subsystem 104 (e.g., propagating along axis 1116 instead). Accordingly, stray light is less likely to re-couple to the optical pathways of the optical assembly.

In some cases, an optical assembly can be configured such that stray light emitted along the secondary emission axis 1102b substantially bounces a minimum of two times before encountering the optical pathways of the optical assembly (e.g., a waveguide apparatus 102, a distribution waveguide apparatus 402, and/or an optical coupler subsystem 104). This can be beneficial, for example, in reducing the amount of light that is re-coupled to the optical pathways.

Although several example techniques for reducing stray light emission are shown and described herein, it is understood they are not mutually exclusive. In some cases, two or more of the described techniques can be used in conjunction to absorb stray light and/or direct stray light in a particular manner to improve the performance of an optical assembly. As an example, one or more light absorbing elements (e.g., as shown and described with respect to FIGS. 5, 6, 8, and 9), one or more gratings (e.g., as shown and described with respect to FIGS. 7 and 10), one or more portions of light emitting materials on peripheral edges of optical components (e.g., as shown and described with respect to FIG. 10), and/or one or peripheral edges that are substantially not parallel to a secondary emission axis (e.g., as shown and described with respect to FIGS. 11A-11C) can be used, either individually or in any combination, to reduce stray light emission with respect to an optical assembly.

A number of embodiments have been described. Nevertheless, it will be understood that various modifications may be made without departing from the spirit and scope of the invention. Accordingly, other embodiments are within the scope of the following claims.

What is claimed is:

1. An eyepiece for a head-mounted display, comprising:
   one or more first waveguides arranged to receive light from a spatial light modulator at a first edge, guide at least some of the received light to a second edge opposite the first edge, and extract at least some of the light through a face of the one or more first waveguides between the first and second edges;
   a second waveguide positioned to receive light exiting the one or more first waveguides at the second edge and guide the received light to one or more first light absorbers;
   a third waveguide arranged to receive light from the spatial light modulator at a third edge, guide at least some of the received light to a fourth edge opposite the third edge, extract at least some of the light through a face of the third waveguide between the third and fourth edges; and
   a fourth waveguide positioned to receive light exiting the third waveguide at the fourth edge and guide the received light to one or more second light absorbers.

2. The eyepiece of claim 1, further comprising optical structures arranged between the second edge of the one or more first waveguides and configured to couple light from the one or more first waveguides into the second waveguide.

3. The eyepiece of claim 1, further comprising a reflector, the second waveguide being arranged between the reflector and the one or more first waveguides, the reflector being configured to reflect light that enters the second waveguide from the one or more first waveguides so that the light is guided to the one or more first light absorbers.

4. The eyepiece of claim 1, wherein the one or more absorbers are located out of a field of view of a user during operation of the head-mounted display by the user.

5. The eyepiece of claim 1, further comprising one or more additional waveguides positioned to receive light exiting the one or more first waveguides at one or more additional edges of the one or more first waveguides, and guide the received light from the one or more additional edges to one or more additional light absorbers.

6. The eyepiece of claim 1, wherein the one or more first waveguides are located in a field of view of a user during operation of the head-mounted display by the user.

7. The eyepiece of claim 1, wherein the one or more first waveguides comprise one or more diffractive optical elements extending between the first edge and the second edge, wherein the one or more diffractive optical elements are configured to extract at least some of the light through a face of the one or more first waveguides between the first and second edge.

8. The eyepiece of claim 7, wherein at least one of the one or more diffractive optical elements is disposed within an interior of the one or more first waveguides.

9. The eyepiece of claim 7, wherein at least one of the one or more diffractive optical elements is disposed along a periphery of the one or more first waveguides.

10. The eyepiece of claim 1, wherein the second waveguide defines a grating pattern along its periphery.

11. The eyepiece of claim 10, wherein the second waveguide is integral with the one or more first waveguides.

12. The eyepiece of claim 11, wherein the grating pattern is defined on at least one of a first face of the second waveguide or second face of the second waveguide, the first face of the second waveguide being opposite to the second face of the second waveguide.

13. The eyepiece of claim 10, wherein the second waveguide is distinct from the one or more first waveguides.

14. The eyepiece of claim 10, further comprising a light absorbing material deposited along the grating pattern.

15. The eyepiece of claim 14, wherein the grating pattern is defined along an entirely of the periphery of the second waveguide.

16. The eyepiece of claim 14, wherein the light absorbing material is deposited along an entirely of the periphery of the second waveguide.

17. The eyepiece of claim 14, wherein the grating pattern is defined along a subset of the periphery of the second waveguide.

18. The eyepiece of claim 14, wherein the light absorbing material is deposited along a subset of the periphery of the second waveguide.

19. The eyepiece of claim 1, comprising an optical coupler subsystem configured to receive the light from the spatial light modulator and direct the light in a first direction towards the first edge of the one or more first waveguides along a primary emission axis.

20. The eyepiece of claim 19, wherein the second waveguide comprises a peripheral edge in a second direction from the optical coupler subsystem, the second direction being opposite from the first direction, the peripheral edge being inclined with respect to the primary emission axis.

* * * * *